Feb. 26, 1935.                L. E. HODGES                1,992,484
                            BRAKE MECHANISM
                          Filed May 19, 1931
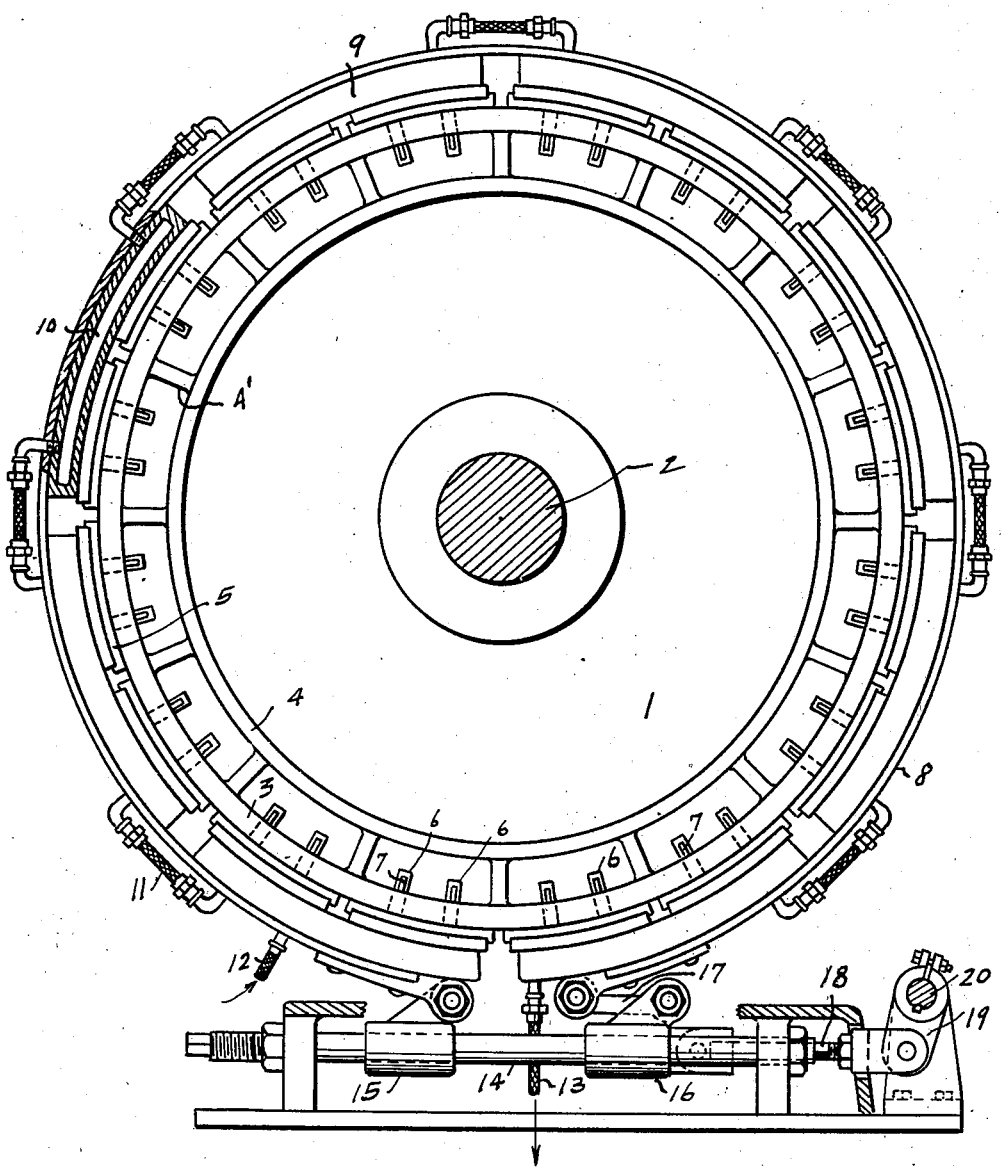
Inventor
Lester E. Hodges
By Hardway Cathey
    Attorneys Patented Feb. 26, 1935

1,992,484

UNITED STATES PATENT OFFICE 1,992,484

BRAKE MECHANISM

Lester E. Hodges, Houston, Tex.

Application May 19, 1931, Serial No. 538,454

8 Claims. (Cl. 188—264)

This invention relates to a brake mechanism.

One object of the invention is to provide a brake mechanism particularly designed for use on drums for handling heavy loads, such as the type of drum used in draw works employed in well drilling operations.

Another object of the invention is to provide a novel type of brake surface.

Another object resides in the provision of a novel type of brake band formed to permit the circulation of a cooling fluid therethrough.

With the above and other objects in view, this invention has particular relation to certain novel features of construction, operation and arrangement of parts, an example of which is given in this specification and illustrated in the accompanying drawing, wherein:—

The figure shows an end view of the drum showing the associated brake mechanism, partly in section.

In the drawing the numeral 1 designates the drum as a whole which is mounted on the shaft 2. The drum has the concentric outer and inner end flanges 3, 4 which are spaced apart and which are connected by the radial webs 4' preferably formed integrally with said flanges. The outer flange 3 is provided to support a brake surface, hereinafter referred to, and the flange 4 is intended for the purpose of supporting a friction surface for an internal expanding clutch whereby the drum may be clutched with said shaft. The clutch mechanism forms no part of this invention and accordingly has not been shown.

Around the flange 3 are the brake shoes 5 which are suitably spaced apart and form the brake surface. These shoes are secured to said flange in any suitable manner, as by the radial, inwardly extending, studs 6, 6, which extend through bearings through the flange 3 and are keyed therein by the cross keys 7. These shoes may therefore be readily removed and replaced.

Around the brake surface is the brake band 8 which has the shoes 9 spaced apart around the inner surface of said band and secured thereto in any suitable manner. The shoes 9 are preferably longer than the shoes 5 and are formed hollow to provide chambers 10 therein for the circulation of a cooling fluid. These chambers are connected by suitable tubes 11, preferably formed flexible, and an inlet line 12 leads into one of the end chambers and an outlet line 13 leads out from the other end chamber of the brake band. A cooling fluid may thus be circulated through the brake band shoes to keep the same cool.

Any suitable means may be provided for setting and releasing the band. As shown there is a track 14 with a yoke 15 fixed thereon and connected to one end of said band. On the track there is a slidable yoke 16 connected to the other end of said band through the link 17. The yoke 16 may be manipulated through the brake rod 18 whose outer end is connected to the brake arm 19 which is fixed to the conventional brake shaft 20.

A brake mechanism of the character described is specially adapted for use on draw works drums for use in well drilling operations to control the load being let down into and withdrawn from wells and in use the friction will generate great heat and for that reason means have been provided for circulating a cooling fluid through the band shoes. The flanges 3, 4, have also been spaced apart so as to permit a circulation of air between them which also assists in keeping the brake surface cool.

The drawing and description disclose what is now considered to be a preferred form of the invention by way of illustration only while the broad principle of the invention will be defined by the appended claims.

What I claim is:

1. A drum having a brake flange, a series of shoes around said flange, a brake band around said shoes, a series of shoes on the inner side of said band arranged to frictionally engage said flange shoes, the shoes of one series having internal chambers and tubes connecting said chambers whereby a cooling fluid may be circulated through said chambers.

2. A drum having a brake surface, a series of shoes around said surface, a brake band around said shoes, a series of shoes on said band in frictional contact with the shoes on said surface, the shoes of one series having internal chambers, flexible tubes connecting said chambers whereby a cooling fluid may be circulated through said chambers.

3. In combination a drum having a brake flange, a series of shoes around said flange, a brake band around said shoes, a series of shoes on the inner side of said band arranged to frictionally engage said flange shoes, the shoes of one series having internal chambers and having conduits connecting said chambers whereby a cooling fluid may be circulated through said chambers.

4. In a brake mechanism, a brake band having a series of shoes arranged around the inner side of the band, said shoes having internal chambers, means flexibly connecting said shoes and provided with conduits through which a cooling fluid may be circulated from chamber to chamber.

5. A brake band of the character described, comprising a split annular body comprising a plurality of chambered block members, a flexible band passing from one end of the body to the other over the outer surfaces of said block members, each of the block members being secured to the said flexible band, means for continuously passing a cooling fluid through each of the block members, means at one end of the brake band for attaching the same to a fixed member, and means at the other end of the brake band for connecting the same to a shiftable member by which the constriction of the band about a brake flange is effected.

6. A fluid cooled brake band, comprising a split annular structure made up of a plurality of relatively short longitudinally arcuate hollow bodies, a resilient band encircling said hollow bodies, means connecting the hollow bodies to the band, a fluid by-pass connecting each hollow body with the next adjacent hollow body, means for introducing fluid into the hollow body at one end of the band, means for removing the fluid from the hollow body at the other end of the band, and means for connecting the ends of the band with mechanism for facilitating the constriction of the band about a brake flange.

7. In a fluid cooled structure of the character described, a brake flange, a plurality of removable friction blocks secured to and about the peripheral surface of the flange, a split band surrounding the flange for engagement with said friction blocks and comprising a plurality of chambered bodies and a band encircling the bodies and connecting the same together, means for introducing fluid into the chambered body at one end of the band and for removing the fluid from the chambered body at the other end of the band, means for by-passing the fluid from one chambered body to the next adjacent body across the space between the bodies, and means for connecting the ends of the band with structure for effecting the constriction of the band about the brake flange.

8. A fluid cooled brake band comprising a split annular body consisting of a plurality of arcuate chambered bodies arranged with their concave surfaces toward the center of the band, a resilient band encircling said bodies, means connecting the resilient band to the convex surfaces of the bodies, a tubular elbow connected at one end in the outer wall of each of the bodies adjacent an end having the end of another body adjacent thereto, means for coupling adjacent ends of said elbows to provide a fluid passageway from one chambered body to the adjacent chambered body, means for introducing fluid into one end chambered body, means for removing fluid from the other end chambered body, means at one end of the split annular body for connecting the same to a fixed member, and means at the other end of the split annular body for connecting the same with a shiftable member.

LESTER E. HODGES.